April 24, 1945.  G. J. HOLTON  2,374,543
METHOD OF DETERMINING THE CHARACTERISTICS OF PIEZOELECTRIC CRYSTALS
Filed May 26, 1942
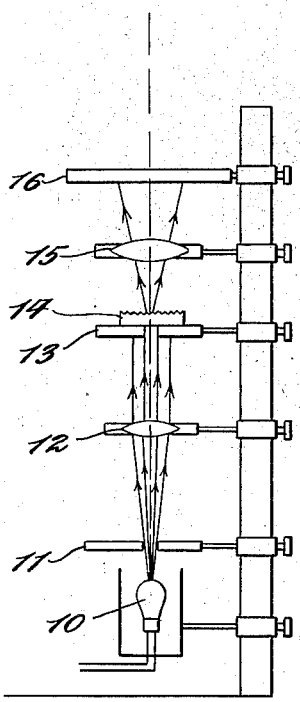
Fig. 1.
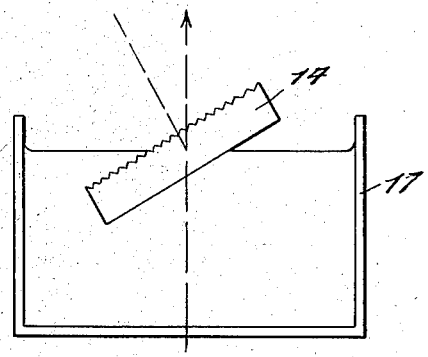
Fig. 2.
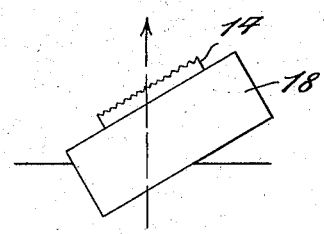
Fig. 3.
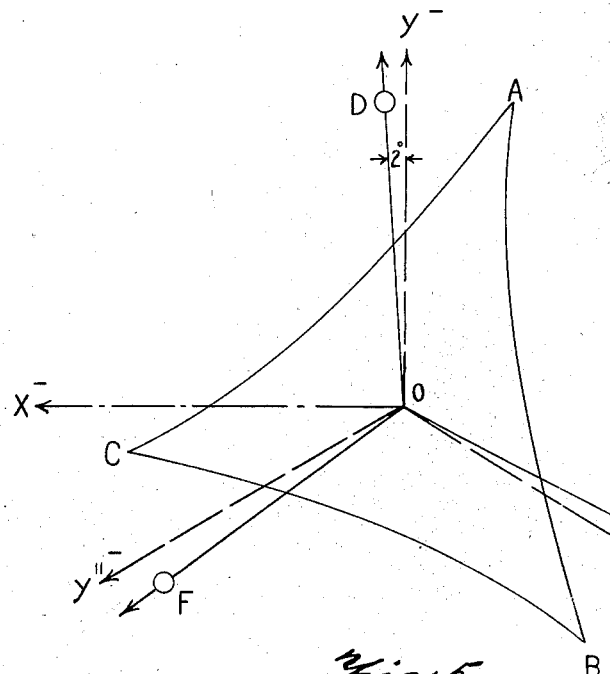
Fig. 5.
Fig. 4.
INVENTOR.
Gerald James Holton
BY
Gifford, Scull & Burgess
ATTORNEYS Patented Apr. 24, 1945

2,374,543

UNITED STATES PATENT OFFICE 2,374,543

METHOD OF DETERMINING THE CHARACTERISTICS OF PIEZOELECTRIC CRYSTALS

Gerald James Holton, New York, N. Y.

Application May 26, 1942, Serial No. 444,608

15 Claims. (Cl. 88—14)

This invention relates to a method of determining the characteristics of piezoelectric crystals by means of etchfigures.

The axes of piezoelectric crystals may be determined by known X-ray and piezoelectric tests. The former procedure is very precise but requires costly apparatus and expert handling. Piezoelectric tests give, at best, only rough approximations of the axial directions. It has also been proposed to determine the direction of the axes of such crystals from etchfigures developed on a surface of the crystal but no method using etchfigures has heretofore been developed by which the axes may be located with any considerable degree of accuracy.

I have found that etchfigure refraction or reflection light patterns by which the characteristics of such a crystal can be readily determined may be obtained if, prior to the etching, the surface to be etched is provided with a plurality of relatively deep scratches or cracks which extend down through that portion of the surface of the crystal which has been distorted or deformed in its previous treatment, as by cutting or polishing. In the subsequent etching, etch facets are formed on the sides and bottoms of the scratches or cracks in addition to those developed on the surface itself, and I have found that light refracted by or reflected from such facets will give a distinctive light pattern from which the axes and other characteristics of the crystal may be determined with great accuracy by a simple method which does not require costly apparatus.

In the accompanying drawing,

Fig. 1 represents schematically an apparatus by which my novel method may be carried out with a suitably etched crystal section;

Figs. 2, 3 and 4 are diagrammatic showings of arrangements by which my method may be applied, in connection with the arrangement of Fig. 1, under certain special conditions;

Fig. 5 shows the general character of the refraction light pattern produced by a crystal section etched according to my method, and showing how the directions of the axes are determined from such a light pattern.

While my method has genereal application, I will describe it as it can be applied in determining the axes of a quartz crystal and other characteristics so that the crystal can be set accurately in the saw for cutting sections therefrom according to any desired relation between the planes of such sections and the axes, it being understood that the principal use of my method is the determination of the $z$ (optic) axes, the $y$ (mechanical) axes and $x$ (electric) axes as well as the right- or left-handedness of the crystal.

The $z$-axis of the whole crystal is first determined approximately by well-known optical methods and then a thin parallel-faced plate may be cut from the mother crystal in approximately the $x$—$y$ plane; that is, roughly perpendicular to the previously-determined approximate $z$-axis; or a plane surface in the $x$—$y$ plane may be cut or ground on the mother crystal.

The surface to be etched is now prepared as I have already described in general terms. The surface may be provided with the desired scratches or cracks by grinding with a relatively coarse grinding powder. I have found that grinding by hand for from one to three minutes with #100 carborundum, with or without carrier, will give satisfactory results. Sometimes the scratches and cracks developed in sawing the section are sufficiently deep for my method, or else are of such a character that little additional grinding is required.

After the treated surface of the crystal is cleaned to remove any grease or dirt thereon, it is etched. For quartz crystal, I have found it most advantageous to use hydrofluoric acid, used preferably at room temperature. I have found that two or more volumes of acid for one volume of crystal is a good working formula. The acid may be diluted or mixed with other materials or the vapor of the acid may be used for etching. It is advisable to put the vessel in which the etching takes place on a table which is given a slow rocking motion while the etching is being done.

The time of etching necessary to produce a satisfactory light pattern for my method is somewhat dependent on the method of producing the scratches or cracks on the surface to be etched. If the crystal has been ground with #100 carborundum for three minutes, a period of between one hour and one and one-half hours of etching will give satisfactory results. But, in any case, care must be taken that the etching does not proceed to a point which will remove the surface sufficiently to cause the relatively-deep cracks or scratches to disappear.

During the etching, the parts of the crystal which are not to be etched may be protected by any suitable resistant coating, such as paraffin.

After being dried, the etched section is ready for examination by means of the light pattern of its etched surface. The apparatus shown in Fig. 1 will be suitable for that purpose. In that figure, a light source, such as a lamp 10, is positioned beneath a shield 11 having a pinhole therein. A lens 12 is used to collimate the light from the pinhole to make the rays substantially parallel, though they may be somewhat convergent or divergent. At a suitable distance above the lens 12 is a platform 13 having an opening therethrough. On this platform, the crystal 14 to be examined is placed with the etched surface uppermost. A lens 15 is used to focus the refracted light passing through the etched surface onto a ground glass or screen or on a photographic emulsion at 16. The latter is used, of course, only where it is desirable to have a permanent record. Ordinarily, a ground glass screen is sufficient and I will describe the method as it would be used with such a screen.

In some cases, it is possible to observe the light pattern produced by the etched surface of the section 14 either by direct observation of the crystal itself or by light reflected from such surface. But, for various reasons, I have found the refraction projection method to be superior.

It is preferable that the light pattern on the screen shall be trigonal and symmetric around its center and this will be the case only if the true z (optic) axis of the crystal coincides with the axis of the beam of light. The platform 13 may be provided with any suitable apparatus by which the angular relation of the etched surface of the section 14 to the axis of the beam can be shifted and such angular relation is changed until the light pattern on the screen becomes symmetric. This determines the correct direction of the z-axis of the section in relation to the etched surface of the section.

It will be found that the light pattern on the screen has the general shape and appearance shown in Fig. 5. That is to say, there will be a generally-triangular and approximately-symmetrical figure with its center O at the axis of the light beam and three small spots of light somewhat near the apexes of the triangle, each spot being adjacent to one of the apexes of the triangle. In Fig. 5, the triangular figure is indicated at A, B, C and the small spots at D, E and F, the spots being formed by light refracted by the facets of the walls of the relatively deep scratches or cracks with which the surface was provided before etching, the star-like pattern A, B, C being formed by light refracted from the facets of the surface itself.

The negative ends of the $y$ axes of the crystal lie approximately in the directions of lines drawn from the center O of the pattern through the centers of the three spots D, E and F. The exact direction of these $y$ axes is substantially 2° from such lines and toward the nearest corner of the triangular pattern A, B, C, as shown in Fig. 5, where the true directions of the negative ends of the three $y$ axes are indicated by the lines OY, OY' and OY''. The negative ends of the $x$-axes will be at right angles to the $y$-axes, or 88° away from such line in the other direction, the negative end of one of these $x$-axes being shown in Fig. 5 as the line OX. The right angle should include one of the spots D, E or F, all as shown in Fig. 5. It is laid off clockwise if the nearer apex of the triangle A, B, C appears rotated counterclockwise from the spot of the pattern and counterclockwise if it appears rotated clockwise.

Having now determined the direction of the several axes of the crystal, their relation to the crystal itself may be fixed in any suitable manner, as, for instance, in relation to a flat side of the crystal which is held, during the observation, against a guide bar or clamp on the platform 13, which guide bar or clamp determines the orientation of the crystal under observation.

If the observations have been made on a section of a mother crystal which is to be cut in any particular way, it is obvious that such mother crystal may now be set in the saw so that sections may be cut in any desired relation to any of the axes. It will be obvious, however, that my method can be applied to the examination of any section of a crystal to determine the characteristics of that section without regard to the mother crystal from which the section was cut.

It is important that the light pattern shall not be distorted by the bottom surface of the crystal opposite the etched surface, particularly when the crystal is set at a considerable angle to the axis of the light beam. Such distortion is likely if this bottom surface is not polished or is not normal to the axis of the light beam. One way of overcoming any difficulty in this respect is to mount the crystal in a shallow vessel filled with a liquid having an index of refraction the same as that of the crystal. Such an arrangement is shown in Fig. 2, where the crystal is immersed in a liquid, such as tricresylphosphate, tetraline or a one-to-one mixture of carbon disulfide and any othe suitable liquid, held in a receptacle 17 which will be placed on the platform 13. Of course, the bottom of the receptacle itself must be such that the light will not be diffused thereby. In the use of such an arrangement as shown in Fig. 2, care should be taken to see that the liquid covers the underside of the section at the axis of the light beam. In the case of thin plates or plates which have large angles of tilt, if there is a possibility that liquid will cover the part of the surface from which the beam emerges, the crystal may be placed on a spacer made of a thick, parallel plate of clear crystal quartz. Such an arrangement is shown in Fig. 3, the spacer being indicated at 18.

If the lower surface of the crystal section being examined is rough but not tilted, the rough surface may be compensated for by spreading a film of compensating liquid on a plate of glass and placing the crystal on such plate of glass with the rough face downward.

For checking the orientation of large numbers of sections of substantially equivalent cuts, a permanent block of quartz, such as shown at 19 in Fig. 4, may be used, the top surface of this block being cut to compensate for the tilt which the section has in relation to the axis of the beam.

I have found that my method can be used satisfactorily with sections whose etched surfaces make large angles, up to 35° or more, with the z-axis, such a large angle being indicated in Fig. 2.

For some purposes, it may be desirable to be able to test a crystal section without adjusting its tilt until a symmetrical light pattern is formed. If the optic axis of the section does not coincide with the axis of the light beam, the light pattern will be distorted. But since such distortion is a function of the angle of tilt, by providing a permanent reference figure for each of a plurality of angles of tilt, it is obvious that a comparison of a distorted light pattern from any particular section with such a set of distorted previously-made light patterns for different angles will enable a quick determination of the angle of tilt of such given section.

My method may also be used in the determination of the axes of crystals other than quartz. For instance, in the case of Rochelle salt, the etching may be done with water or a mixture of water and glycerin. Of course, the light pattern from such a crystal will be different from that of quartz.

Besides determining the direction of the axis, my method makes possible also the determination of the right- or left-handedness of enantiomorphic crystals, as well as twinning. If the quartz from which the section is cut is left-handed, the apexes of the triangle ABC (Fig. 5) will appear displaced to the right (clockwise) of the nearest spots, D, E, F, as shown in Fig. 5; and, if the quartz is right-handed, such displacement of the apexes will be to the left (anticlockwise) of such spots. Brazil twinning at the surface will thus be apparent if the two patterns for right and left quartz appear when the crystal section is moved on its support 13 to and fro to bring different portions of the crystal into the light beam. In the case of other cuts or other crystals, where the etch figures at the opposite ends are different in form (i. e., on the $+x$ and $-x$ faces), the refraction reveals all types of twinning. For example, the $+x$ face has a refraction pattern much like a parallelogram; the refraction pattern from the $-x$ face of right quartz is more or less one straight line. Thus optical twinning on the surface will be indicated by the presence of two patterns of the same type, but one the mirror of the other. Electrical twinning is present if the two different patterns for $+$ or $-$ faces are seen for the same surface.

I claim:

1. The method of determining a mechanical axis of a quartz crystal which comprises ascertaining the approximate direction of the optical axis of the crystal, forming a plurality of relatively deep scratches or cracks on a face of the crystal, which face is roughly normal to the optical axis of the crystal, etching the face, including the walls of the scratches or cracks, continuing the etching until etchfigures are formed on the face and on the walls of the scratches or cracks but not so long as to eliminate the scratches or cracks, projecting a beam of light through the etched surface, focusing the refracted rays to form a refraction pattern on a screen, adjusting the angle of the face in relation to the axis of the beam of light until the refraction pattern is symmetrical and consists of a generally-triangular figure with small spots adjacent the apexes of the triangle, and then locating the direction of a mechanical axis of the crystal by a line from the center of the refraction pattern passing through a point 2° from the center of one of the spots and between the spot and the adjacent apex of the triangle of the pattern.

2. A method of determining a mechanical axis of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the etching being controlled so as not to eliminate the scratches or cracks, passing a beam of light through said crystal along its optical axis and from a direction opposite to the etched surface thereby forming a symmetrical refraction pattern from the etchfigures on the surface and the walls of the scratches or cracks consisting of a triangular figure with a small spot adjacent each apex, and then locating a mechanical axis of the crystal by a line extending from the center of the triangular figure through a point lying 2 degrees from the center of one of the spots and between said spot and the nearest apex of the triangular figure.

3. A method of determining a mechanical axis and an electrical axis of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the time of etching being controlled so as not to eliminate the scratches or cracks, passing a beam of light through said crystal along its optical axis thereby forming a symmetrical refraction pattern consisting of a triangular figure with a small spot adjacent each apex, locating a mechanical axis of the crystal by a line passing through the center of the triangular figure and a point lying 2 degrees from the center of one of the spots and between said spot and the nearest apex of the triangular figure, and then locating an electrical axis of the crystal by a line extending from the center of the triangular figure at 90 degrees to the mechanical axis, the 90 degrees being measured in a direction away from the apex of the triangular figure nearest the spot.

4. A method of determining the mechanical axes of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the time of etching being controlled so as not to eliminate the scratches or cracks, passing a beam of light through said crystal along its optical axis thereby forming a symmetrical refraction pattern consisting of a triangular figure with a small spot adjacent each apex, and then locating the mechanical axes of the crystal by lines passing through the center of the triangular figure and points lying 2 degrees from the center of each of the spots and between each spot and the nearest apex of the triangular figure, respectively.

5. A method of determining the electrical and mechanical axes of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the time of etching being controlled so as not to eliminate the scratches or cracks, passing a beam of light through said crystal along its optical axis thereby forming a symmetrical refraction pattern consisting of a triangular figure with a small spot adjacent each apex, then locating the mechanical axes of the crystal by lines passing through the center of the triangular figure and points lying 2 degrees from the center of each of the spots and between each spot and the nearest apex of the triangular figure, respectively, and then locating the electrical axes of the crystal by lines extending from the center of the triangular figure at 90 degrees to the respective mechanical axes, the 90 degrees in each case being measured in a direction away from the apex of the triangular figure nearest the respective spots.

6. The method of determining a mechanical axis of a quartz crystal which comprises ascertaining the approximate direction of the optical axis of the crystal, forming a plurality of relatively deep scratches or cracks on a face of the crystal, which face is roughly normal to the optical axis of the crystal, etching the face, including the walls of the scratches or cracks, continuing the etching until etchfigures are formed on the face and on the walls of the scratches or cracks but not so long as to eliminate the scratches or cracks, passing a beam of light through the crystal approximately along its optical axis and thereby forming from the walls of the scratches or cracks a symmetrical light pattern which includes isolated light spots, and determining the approximate location of a mechanical axis of the crystal by a line passing from the center of the pattern to within a few degrees of one of said spots.

7. In a method of determining a mechanical axis of a crystal the steps of forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the etching being controlled so as not to eliminate the scratches or cracks, passing a beam of light through said crystal along its optical axis and from a direction opposite the etched surface thereby forming a symmetrical triangular refraction pattern from the etchfigures on the surface and spots from the etchfigures on the walls of the scratches or cracks with one of the spots adjacent to each apex of the triangular pattern, and determining the location of a mechanical axis by a line passing approximately from the center of the triangular pattern to a point between one of said spots and the nearest adjacent apex of the triangular pattern.

8. A method of determining a mechanical axis of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the etching being controlled so as not to eliminate the scratches or cracks, passing a beam of light through said crystal along its optical axis and from a direction opposite the etched surface thereby forming a symmetrical refraction pattern from the etchfigures on the surface and a symmetrical refraction pattern from the etchfigures on the walls of the scratches or cracks, said patterns forming a composite pattern consisting of a triangular figure with a small spot adjacent each apex, and locating a mechanical axis of the crystal by a line passing approximately from the center of the triangular figure to within a few degrees of one of said spots.

9. A method of determining electrical and mechanical axes of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the etching being controlled so as not to eliminate the scratches or cracks, passing a beam of light through said crystal along its optical axis and from a direction opposite the etched surface thereby forming respective symmetrical refraction patterns from the etchfigures on the surface and the walls of the scratches or cracks, said patterns forming a composite pattern consisting of a triangular figure with a small spot adjacent each apex, and locating by a line passing approximately from the center of the triangular figure through a point between one of said spots and the apex of the triangular figure nearest thereto a mechanical axis of the crystal and locating an electrical axis of the crystal by reference to the said line.

10. A method of determining the mechanical and electrical axes of a crystal which comprises forming a plurality of relatively deep scratches or cracks on a face of the crystal, the plane of said face having an angular relation to the optical axis of the crystal, etching the surface, including the scratches or cracks, of said crystal face until etchfigures are formed on the surface and on the walls of the scratches or cracks, the etching being controlled so as not to eliminate the scratches or cracks, passing a beam of light through said crystal along its optical axis and from a direction opposite the etched surface thereby forming respective symmetrical light patterns from the etchfigures on the surface and those on the walls of the scratches or cracks, said patterns forming a composite pattern consisting of a triangular figure with a small spot adjacent each apex and locating by lines passing from approximately the center of the triangular figure to within a few degrees of said spots the mechanical axes of the crystal and locating the electrical axes by reference to said lines.

11. A method of determining an electric axis of a crystal which includes the steps of forming a plurality of relatively deep scratches or cracks on a face of the crystal which is approximately normal to the optical axis of the crystal, etching the said face, including the scratches or cracks, until etchfigures are formed on the face and on the walls of the scratches or cracks while maintaining the general configuration of the scratches or cracks, passing a beam of light through said crystal along its optical axis from a direction opposite the etched face of the crystal thereby forming a refraction pattern which includes a symmetrical triangular figure with isolated light spots adjacent its vertices, and determining the electric axis of the crystal by reference to a line passing approximately from the center of the triangular figure to within a few degrees of one of said spots.

12. In a method of determining a mechanical axis and the right or left handedness of crystals, the steps of forming a face on a crystal which is perpendicular to its optical axis, then forming a plurality of relatively deep scratches in such face, and, while preserving the general contour of such scratches, etching the face and the walls of the scratches therein, then passing a beam of light through said face, thereby forming a composite light pattern with a part of the pattern appearing as isolated light spots formed by the etched walls of the scratches, and another part of the pattern appearing as a triangular figure, then locating the direction of a mechanical axis of the crystal by a line from the center of the triangular figure to within a few degrees of one of said light spots, and determining the right or left handedness of the crystal by noting upon which side of the nearest adjacent apex of the triangular figure falls the light spot, the crystal being left-handed when the apices of the triangular figure appear displaced to the right of the nearest light spots.

13. A method of determining the optical axis of a crystal which includes the steps of first locating approximately the optical axis of the crystal by passing a beam of polarized light through it, forming on the crystal a face which is roughly normal to the approximate optical axis of the crystal, and which has relatively deep scratches or cracks therein, etching the face to form etchfigures thereon without removing the previously formed scratches or cracks, passing a beam of light through the face thus provided to form on a screen a light refraction pattern which includes a triangular figure with isolated spots adjacent to its apexes, and adjusting the angular relation of the face of the crystal to the axis of the beam until the three spots become substantially equi-distant from each other and from the center of the pattern, whereby the true optical axis of the crystal is caused to coincide with the axis of the light beam.

14. In a method of determining a mechanical axis and the right or left handedness of crystals, the steps of forming a face on a crystal which is perpendicular to its optical axis, then forming a plurality of relatively deep scratches in such face, and, while preserving the general contour of such scratches, etching the face and the walls of the scratches therein, then passing a beam of light through the face thus provided to form on a screen a light refraction pattern which includes a triangular figure with isolated spots adjacent to its apexes, adjusting the angular relation of the face of the crystal to the axis of the beam until the three spots become substantially equidistant from each other and from the center of the pattern, whereby the true optical axis of the crystal is caused to coincide with the axis of the light beam, then locating the direction of a mechanical axis of the crystal by a line from the center of the triangular figure to within a few degrees of one of said light spots, and determining the right or left handedness of the crystal by noting on which side of the nearest adjacent apex of the triangular figure falls the light spot, said crystal being left handed if the spot is rotated counter-clockwise from the nearest apex and right handed if rotated clockwise from the nearest apex.

15. A method of determining right and left handedness of a crystal which comprises forming a plurality of relatively deep scratches or cracks on a face of the crystal, the plane of said face being approximately normal to the optical axis of the crystal, etching the surface, including the scratches or cracks, of said crystal face until etchfigures are formed on the surface and on the walls of the scratches or cracks, the time of etching being controlled so as not to eliminate the scratches or cracks, passing a beam of light through said crystal substantially along its optical axis thereby forming a symmetrical refraction pattern consisting of a triangular figure with a small spot adjacent each apex, and then determining the right or left-handedness of the crystal from the location of the spots with respect to the apexes of the triangular figure, said crystal being left-handed if the spot is rotated counterclockwise from the nearest apex and right-handed if rotated clockwise from the nearest apex.

GERALD JAMES HOLTON.